Sept. 25, 1945. L. YAGER ET AL 2,385,596
COUPLING ASSEMBLY
Filed Aug. 11, 1944 10 Sheets-Sheet 1

Fig. 1.

Inventors:
Louis Yager,
John W. Cummings,

Sept. 25, 1945.　　　L. YAGER ET AL　　　2,385,596
COUPLING ASSEMBLY
Filed Aug. 11, 1944　　　10 Sheets-Sheet 3

Inventors:
Louis Yager,
John W. Cummings,
Attorneys.

Sept. 25, 1945.　　　L. YAGER ET AL　　　2,385,596
COUPLING ASSEMBLY
Filed Aug. 11, 1944　　　10 Sheets-Sheet 4

Inventors:
Louis Yager, &
John W. Cummings,

Sept. 25, 1945. L. YAGER ET AL 2,385,596
COUPLING ASSEMBLY
Filed Aug. 11, 1944 10 Sheets-Sheet 5

Inventors:
Louis Yager,
John W. Cummings,
By Cushman Darby Cushman
Attorneys.

Sept. 25, 1945. L. YAGER ET AL 2,385,596
COUPLING ASSEMBLY
Filed Aug. 11, 1944 10 Sheets-Sheet 6

Fig. 6.

Inventors:
Louis Yager,
John W. Cummings,
By Cushman Darby Cushman
Attorneys

Patented Sept. 25, 1945

2,385,596

UNITED STATES PATENT OFFICE 2,385,596

COUPLING ASSEMBLY

Louis Yager and John W. Cummings, New York, N. Y.

Application August 11, 1944, Serial No. 548,992

23 Claims. (Cl. 280—33.1)

The present invention relates to an improved coupling for detachably connecting a towing vehicle to a trailing vehicle.

An important object of the invention consists in providing a vehicle coupling assembly in which one of the vehicles carries a coupler ball arranged to be guided into and engaged by a socket on another vehicle. The socket is preferably formed with a fixed section and a pair of movable sections or jaws arranged to be moved to opened and closed positions relative to the fixed section to allow the ball to be moved into the socket or removed therefrom. Pressure means associated with the movable sections tend to urge them toward each other to retain the ball in the socket, and a locking member coacts with the pressure means to insure the movable sections being firmly engaged with the ball. Means operatively connected to the pressure means and the locking member serves to release the pressure on the movable sections and also releases the locking member from the movable sections to allow withdrawal of the coupler ball from the socket.

A further object consists in providing a tractor with a base having a socket, and a ramp for guiding a ball on a trailer into and from the socket, said socket having movable sections normally closed by pressure means and arranged to be moved and held in an open position to permit entrance of the ball into the socket and withdrawal therefrom. A locking member pivoted on the base normally assumes a position substantially parallel with the ramp and is arranged to be swung upwardly to engage and retain the movable sections of the socket in their closed position. The locking member is also provided with spaced means arranged to engage the movable sections of the socket when the latter are in their open position, and to extend into the path of the ball as the latter moves upwardy on the ramp so as to be depressed thereby and thus automatically release the movable sections and swing the locking member into engagement with these sctions when the ball is moved completely into the socket.

Another object consists in providing a coupling or trailer hitch assembly with a base having a socket including movable sections operable to permit a coupler ball to be moved into the socket or removed therefrom, and in which compression means associated with the movable sections acts to maintain these sections in their closed position. Additionally, means preferably in the form of a pair of dog levers are positioned to contract the compression means to release the pressure thereof on the movable sections of the socket, and a movable shaft is operatively connected to the dog levers through a universal coupling for controlling the compressive action of the compression means. The parts are constructed and arranged to constitute simple, efficient and positive means for automatically and expeditiously latching or unlatching a tractor to a trailer at a minimum expenditure of time and effort.

Referring to the drawings in which is shown a preferred embodiment of the invention.

Figure 1:
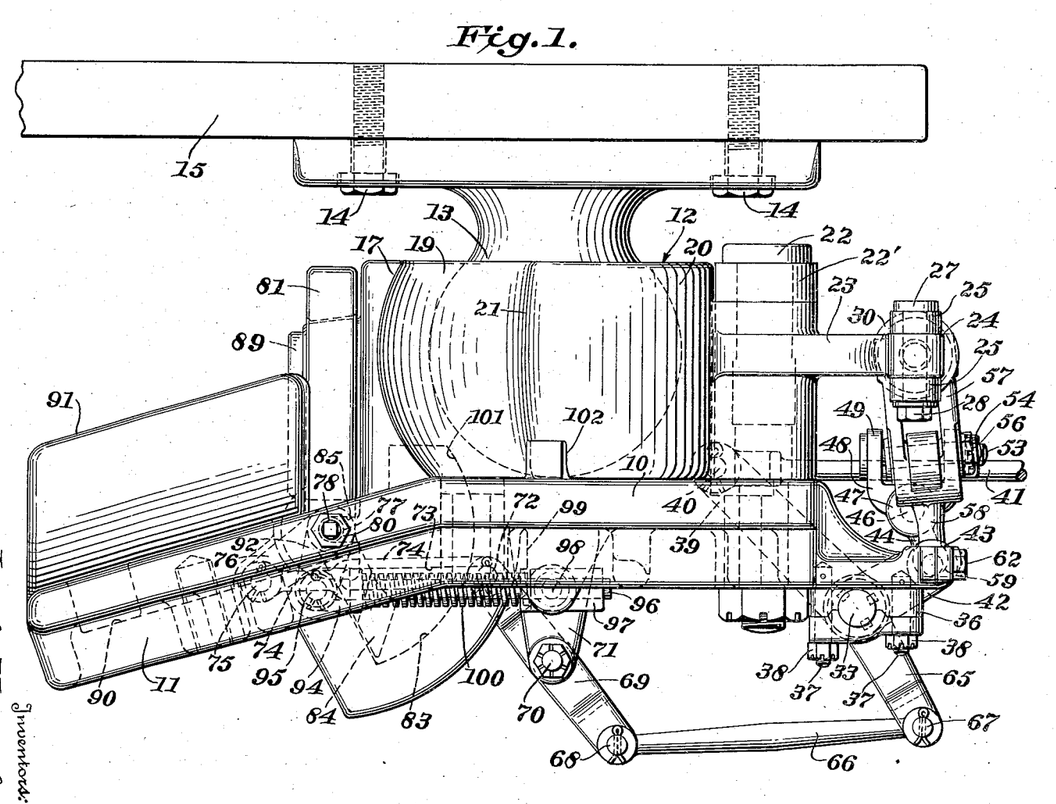
Figure 1 is a side view of the coupling assembly showing the coupler ball secured in the socket.
Figure 2:
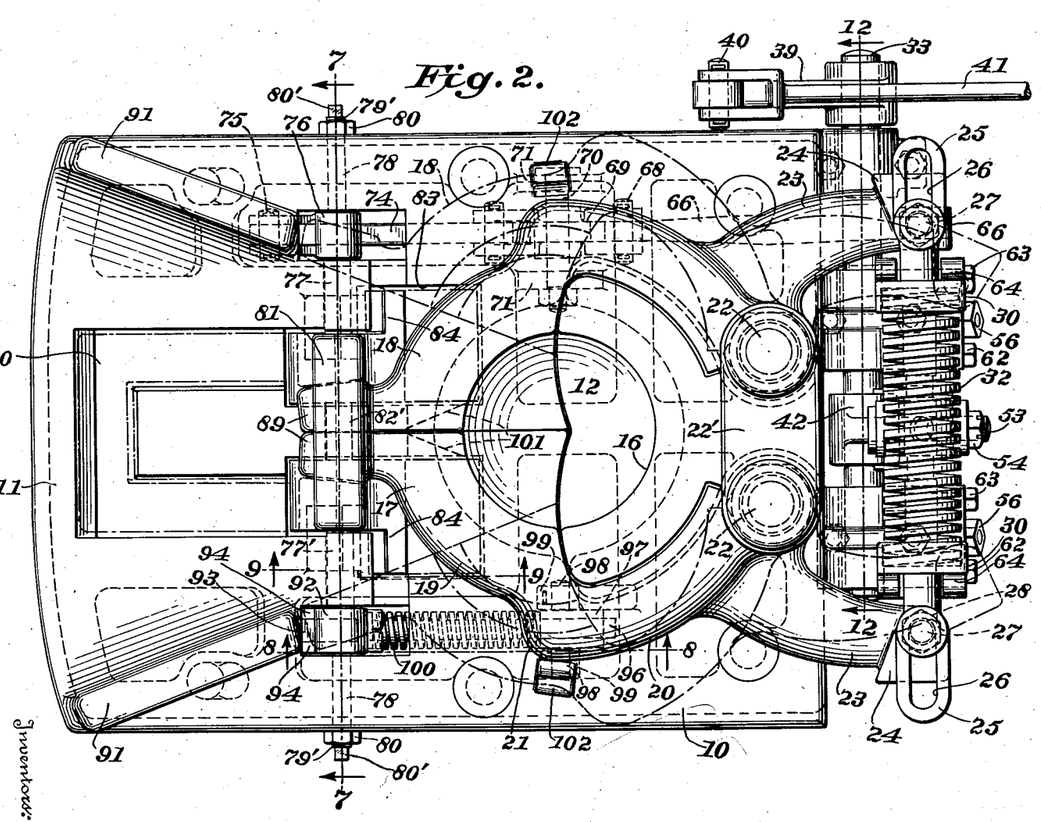
Figure 2 is a plan view of the socket member or base with the ball removed and the parts in their closed position.
Figures 3, 13:
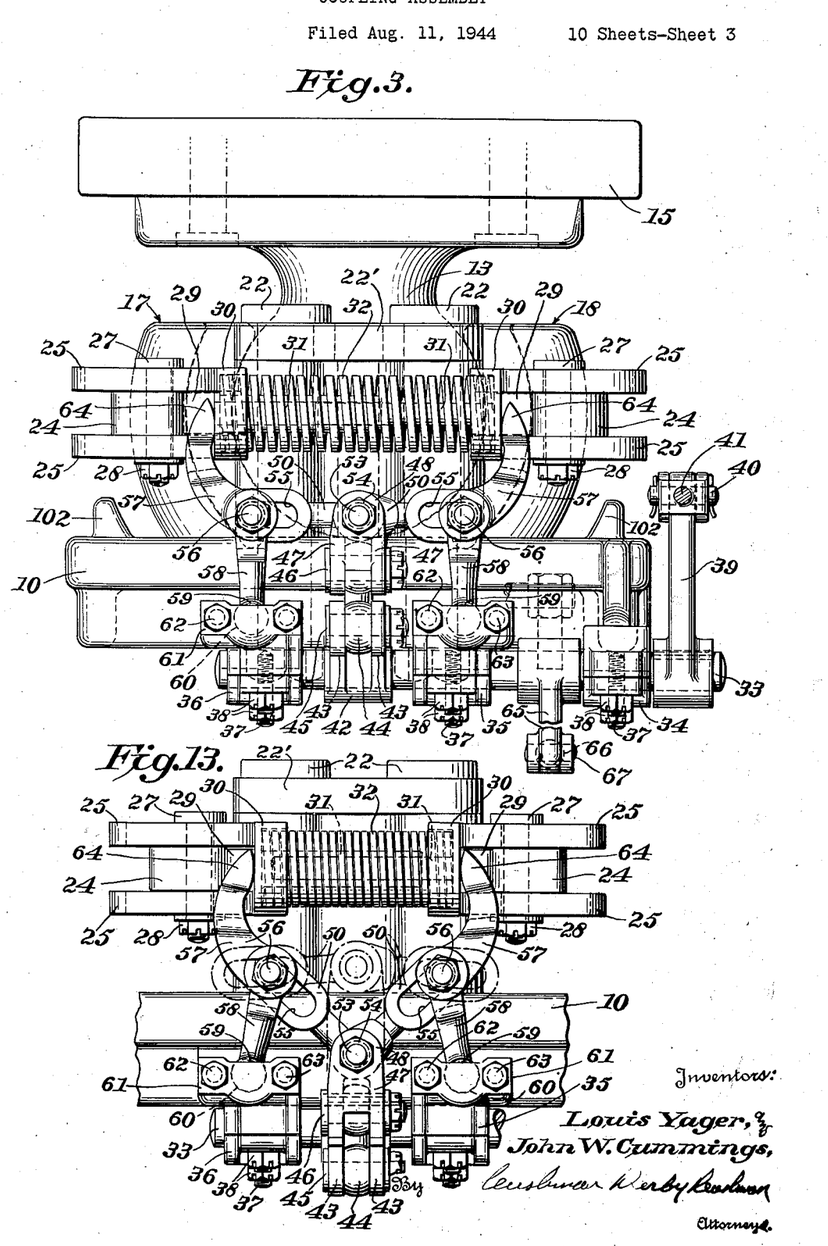
Figure 3 is a front view of Figure 1.
Figure 13 is a fragmental front view of the socket member of the coupling showing the spring in its compressed position for releasing the movable socket members and showing the drag links in dotted lines in one of their operative positions.
Figures 4, 15, 16, 17, 18, 19, 20:
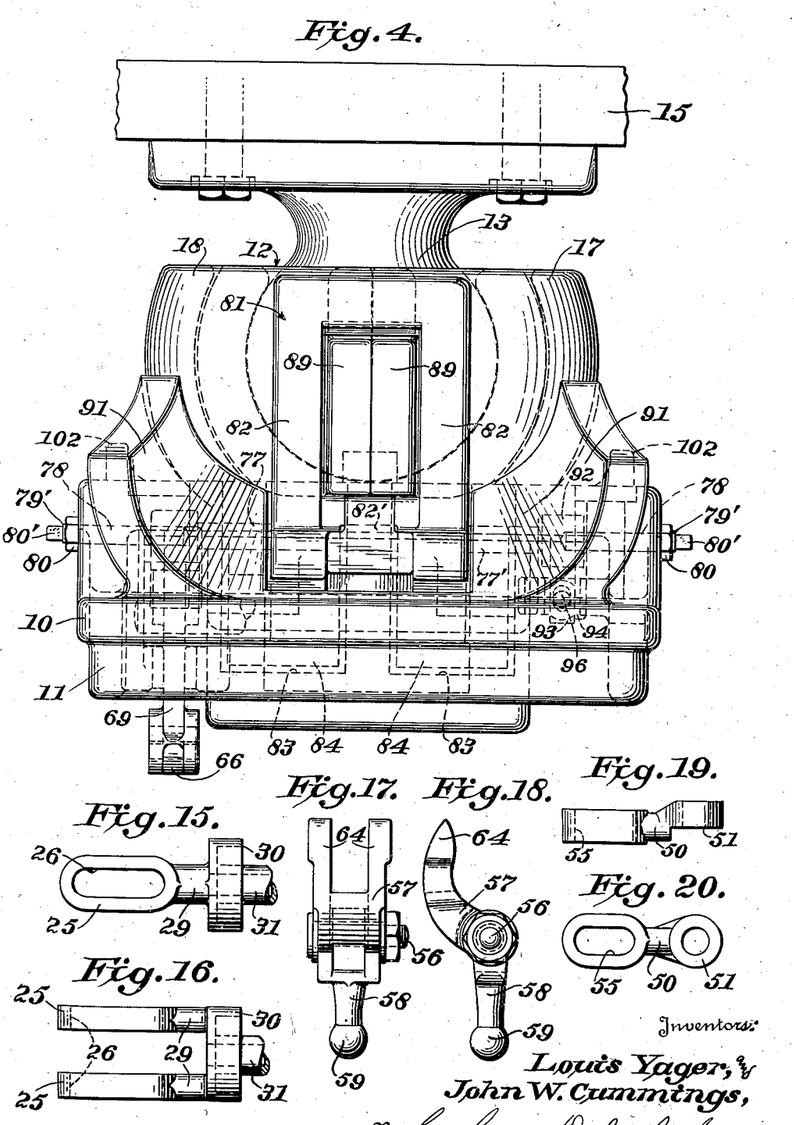
Figure 4 is a rear view of Figure 1.
Figure 15 is a detailed plan view of one of the spring cap members.
Figure 16 is a side view of Figure 15.
Figure 17 is a side view of one of the dog levers.
Figure 18 is a front view of Figure 17.
Figure 19 is a detailed plan view of one of the drag links.
Figure 20 is a side view of Figure 19.
Figure 5:
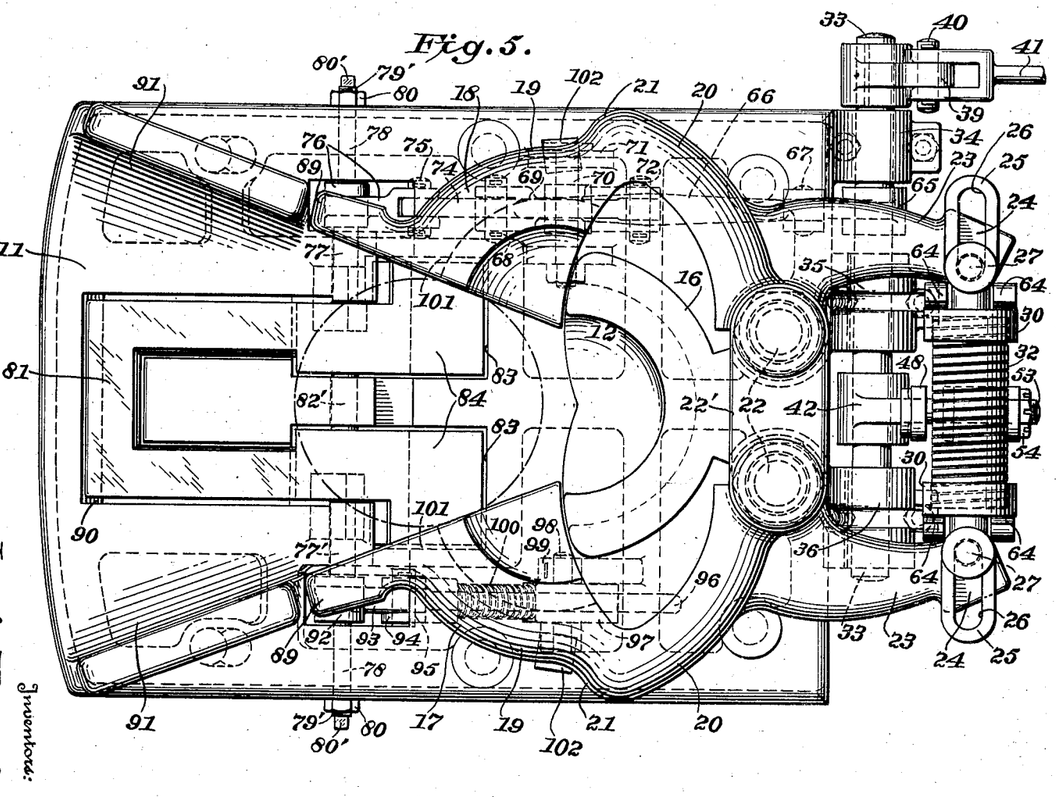
Figure 5 is a plan view similar to Figure 2 with the parts in their opened position.
Figure 10:
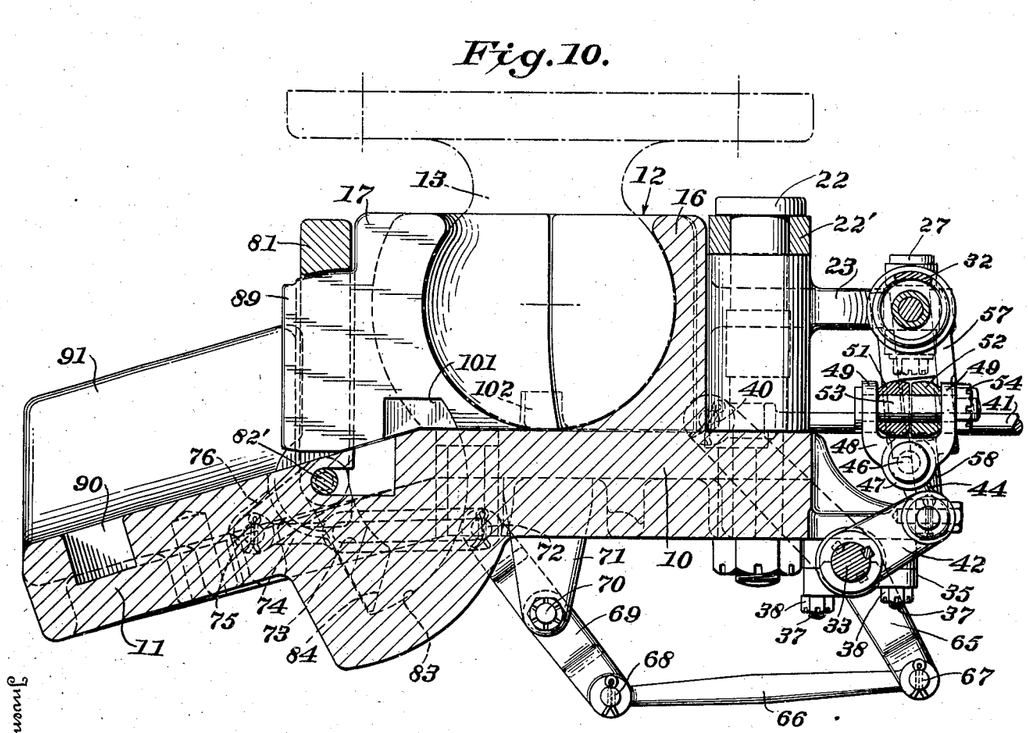
Figure 10 is a central longitudinal section of the coupling assembly showing the coupler ball clamped in the socket.
Figure 12:
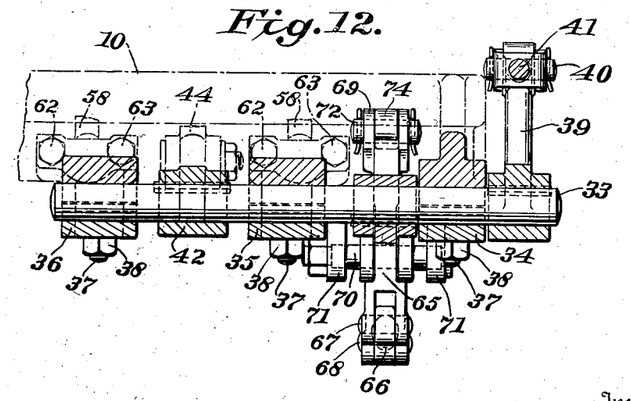
Figure 12 is a detailed cross sectional view of the operating shaft and its associated parts, taken substantially on line 12—12 of Figure 2.

Referring to the drawings, 10 designates a base or supporting plate which extends rearwardly from a towing vehicle such as a tractor or the like, not shown, and has at its rear end an inclined ramp 11. A centrally disposed cylindrical socket 12 (Figure 1) projects upwardly from the base and is arranged to receive a coupling ball or depending member 13 connected by the threaded bolts 14 to the underside of a bar or member 15 that extends forwardly from the front of the trailer. The socket 12 preferably comprises a semi-circular fixed section 16 that extends upwardly and medially from the forward portion of the base and a pair of movable sections or jaws 17 and 18. Each of the jaws is similarly shaped and has an intermediate curved portion 19 (Fig. 5) connected to a forward curved portion 20 by an offset shoulder 21 so that the portions 20 overlap the adjacent sides of the fixed section 16 of the socket. The forward or front ends of the movable sections 17 and 18 are pivoted by the vertical bolts 22 to the base and have extending forwardly therefrom spaced arms or members 23 provided with reduced flat terminal portions or heads 24 preferably of the shape as shown in Figure 5. Each of the heads 24 extends between a pair of spaced flat arms 25 having elongated aligned slots 26 (Fig. 2) which loosely receive threaded bolts or pins 27 carried by the heads 24, and removably secured thereto by the nuts 28. The spaced arms 25 are connected by reduced portions 29 (Fig. 16) to a cap or socket member 30 having an inwardly extending guide rod 31. A strong and durable coil compression spring 32 has its ends extending into the caps 30 and rods 31 and tends to move the arms 23 of the socket outwardly and the opposite ends of the movable sections inwardly towards each other to close the socket and retain the ball therein. An operating shaft 33 is rotatably mounted in spaced bearings 34, 35 and 36 connected by threaded bolts 37 (Fig. 12) and the nuts 38 to the under side of the front end of the base. An actuating lever 39 is keyed or otherwise secured at its lower end to the shaft 33 and has its upper end pivotally connected as at 40 to a rod 41 which extends forwardly so as to be conveniently actuated by the operator of the tractor. Keyed to the shaft 33 intermediate the ends thereof is an arm 42 having spaced lugs 43 (Fig. 3) to which is pivotally connected the lower end of a rod 44 as at 45. The upper end of the rod 44 is similarly connected as at 46 to spaced depending lugs 47 on a member 48 which, in turn, has spaced upwardly extending ears 49 (Fig. 10) disposed at right angles to the lugs 47. Extending laterally from opposite sides of the member 48 are drag links 50 which have their inner enlarged ends 51 and 52 positioned within the ears 49 and provided with aligned transverse openings through which extends a threaded bolt 53 carried by the ears 49 and secured thereto by the nut 54. Each of the outer ends of the drag links 50 is formed with an elongated slot 55 to which is pivotally and slidably connected as at 56 a dog lever 57. The lower arm 58 of each of the dog levers terminates in a ball 59 mounted in a curved socket 60 formed by the clamping members 61 which are secured by the threaded bolts 62 and 63 to the base 10 in such a manner that the balls 59 permit the arms 58 to be swung laterally towards and away from each other. Each of the dogs 57 has extending upwardly therefrom bifurcated arms 64 which extend between the arms 29 of the caps 30 so as to bear against the outer sides of the caps to control the tension of the compression spring 32. Thus, it will be seen that the shaft 33 is operatively connected to the dog levers 57 by a universal coupling which causes the drag links 50 to swing downwardly as the arm 42 is rotated by the shaft 33 and the upper ends 64 of the dog levers 57 to be moved toward each other to release the pressure of the spring 32 on the movable sections 17 and 18 of the socket. A transverse link 22' connects the upper ends of the bolts 22 (Fig. 2) and provides a tie-bearing or reinforcement for the bolts adjacent the pivoted connection of the jaws 17 and 18 with the base 10.

Figure 11:
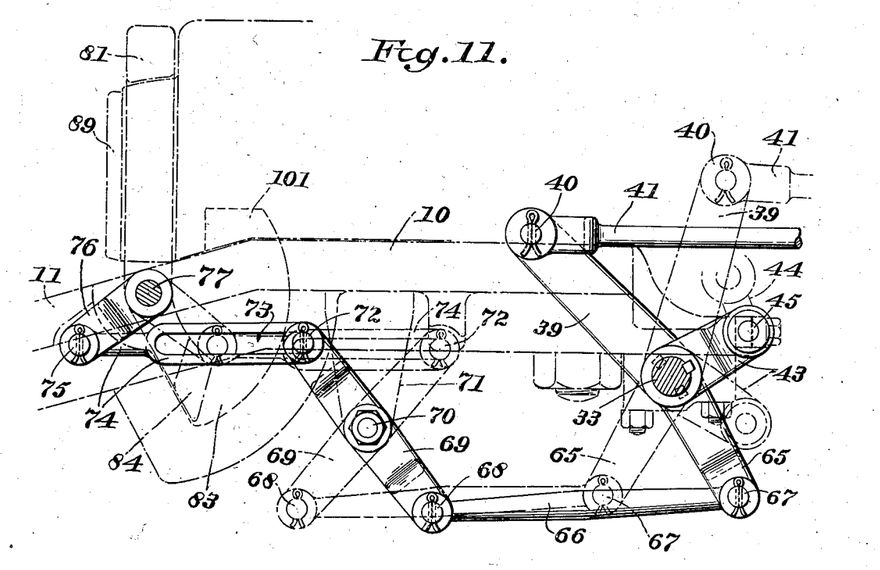
Figure 11 is a skeleton elevational view of the operating means for unlocking the coupling assembly, to release the coupler ball, the full-line showing of the levers and arms indicating the locked positions of the parts, and the broken-line indicating the unlocked positions.
Figure 14:
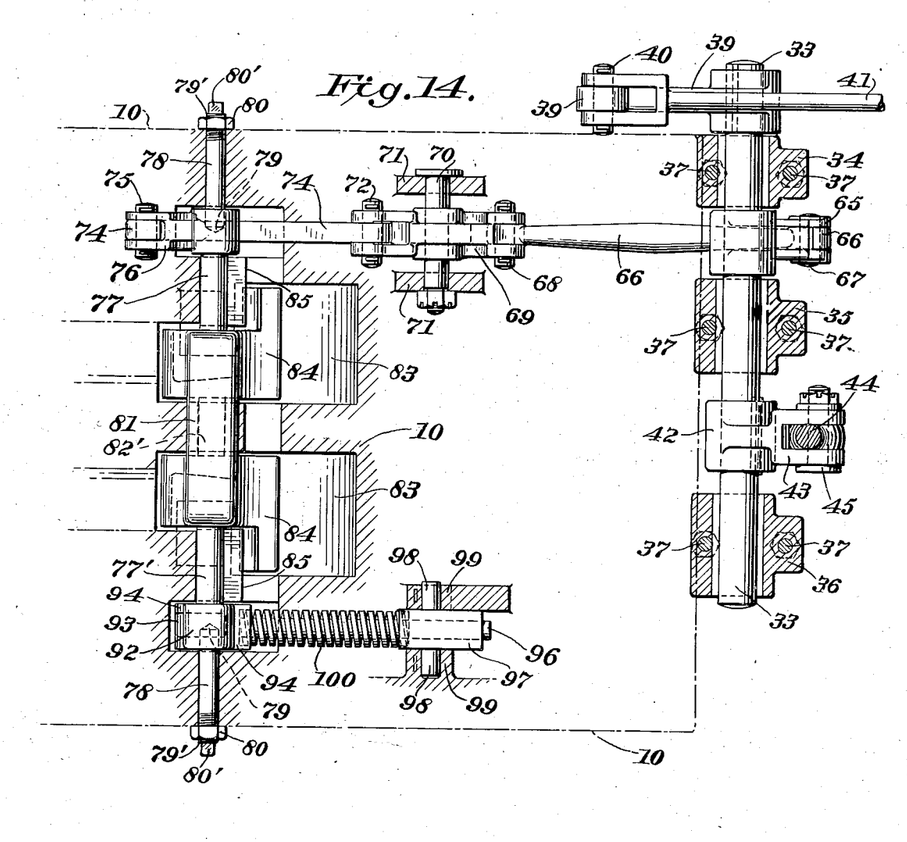
Figure 14 is a detailed sectional plan view showing the operative connection of the actuating lever with the operating shaft and the locking member.

Keyed to the operating shaft 33 and extending downwardly therefrom is an arm or lever 65, the lower end of which is pivotally connected to a rearwardly extending rod 66 as at 67. The rear end of the rod 66 is pivotally connected as at 68 to an arm 69 pivoted between its ends as at 70 to spaced depending brackets 71 on the under side of the base 10. The upper end of the arm 69 carries a transverse pin 72 (Fig. 11) slidable in an elongated slot 73 in a rod 74 which has its rear end pivotally connected at 75 to an arm or crank lever 76 integral with a pivoted stud 77 that extends outwardly from one side of the locking member 81. A similarly shaped pivoted stud 77' (Fig. 14) extends from the opposite side of the locking member 81 and is in transverse alignment with the stud 77. The outer ends of these studs are recessed and have tapered inner walls which receive trunnions or pintles 78 which extend transversely through the base 10 and have their inner ends 79 tapered so as to rotatably engage the inner walls of said recesses. The outer end portions of the trunnions 78 are threaded as at 79' to receive the clamping nuts 80 for firmly maintaining the trunnions in a fixed position, and terminate in a square tool receiving head 80'. The locking member 81 preferably is of substantially inverted U-shape and has side arms 82 to which are integrally connected, adjacent their lower ends, the pivoted studs 77 and 77', and an intermediate stud or rod 82' (Fig. 7) that is coaxial with the studs 77 and 77' and is rotatable in the base 10. These studs, of course, could be in the form of a one-piece shaft extending through the arms 82 and the base and suitably fastened thereto to impart movement to the locking member.

Figure 9:
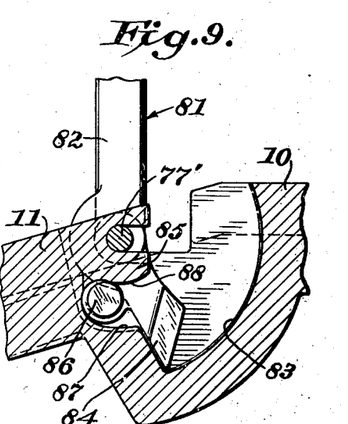
Figure 9 is a sectional view taken substantially along the line 9—9 of Figure 2.

The top of the base 10 is formed with spaced depressions 83 which receive spaced transversely disposed tail pieces 84 that extend outwardly and angularly from the lower ends of the arms 82. The locking member 81 is supported on the pivoted studs 77 and 77' by slotted bearings 85 with which are associated strain blocks 86 integral with the tail pieces 84 and are loosely mounted in offset portions 87 of the depressions 83 adjacent and below the studs 77 and 77' (Fig. 9). The blocks 86 contact the under side of the bearings 85 as at 88 and follows a snug curve in the wall of the offset portions 87 so as to assist in firmly maintaining the lock 81 in its vertical or closed position. The rear end of the movable sections 17 and 18 of the socket member are formed centrally with outwardly extending portions or arms 89 having flat vertical sides which abut each other when the socket is closed. The locking member 81 is of such shape and dimensions that the arms 82 thereof bear against the adjacent sides of the arm 89 when the latter are in their closed position to retain the movable sections of the socket firmly against the coupler ball 13. The spring 32 serves to close the socket while the locking member 81 holds the members 17 and 18 in their closed position.

The upper surface of the ramp 11 has a substantially U-shaped recess 90 (Fig. 2) arranged to receive the locking member 81 when the latter is moved away from the movable sections to its inoperative position. Inclined fenders 91 extend forwardly from the ramp and have their converging ends spaced apart slightly wider than the diameter of the coupling ball 13 so as to guide the latter to the center of the socket 12. The pivoted stud 77' has at its outer end an integral member 92 (Fig. 7) provided with a depending arm 93 to the outer end of which is pivotally connected a bifurcated block 94 as at 95. The block 94 has extending therefrom a guide rod 96 which extends loosely through a bearing block 97 (Fig. 8) pivotally supported by lateral projections 98 to a pair of spaced depending brackets 99 (Fig. 14) on the under side of the base 10. A coil spring 100 encircles a portion of the rod 96 and is confined between the blocks 94 and 97 so that when the locking member 81 is in its closed position, the fulcrum point 95 (Fig. 8) is below and past dead center of the pivot of the stud 77' of the locking member, with the result that the spring 100 expands to yieldably maintain the lock 81 in engagement with the arms 89 of the movable socket sections 17 and 18. The under side of each of the intermediate portions 19 of the movable sections 17 and 18 of the socket is formed with a recess or notch 101 (Fig. 6) which is arranged to be engaged by a portion of an adjacent tail piece 84 when the movable sections are in their open position so as to maintain them in this position until the tail pieces 84 are depressed by the coupler ball 13. Preferably, the locking member 81, tail piece 84. locks 86, lever 76 and 92 and stud 77, 77' and 82' are all of one piece in order to simplify manufacturing and reduce the number of parts and can be formed from any suitable casting. Manifestly, these parts could be made separately and connected to provide a unitary operative structure. The trunnions 78 to which the studs 77 and 77' are rotatably connected, tends to maintain the locking member 81 in proper position and also act to prevent the studs from moving out of the supporting bearings 85 or from chattering. When the locking member 81 is moved to its inoperative position in recess 90, the tail pieces 84 on the arms 82 of the locking member are of sufficient length and width to project upwardly from the base 10 so as to be positioned in the path of movement of the coupler ball 13 and also engage the under side of the movable sections 17 and 18.

Figure 6:
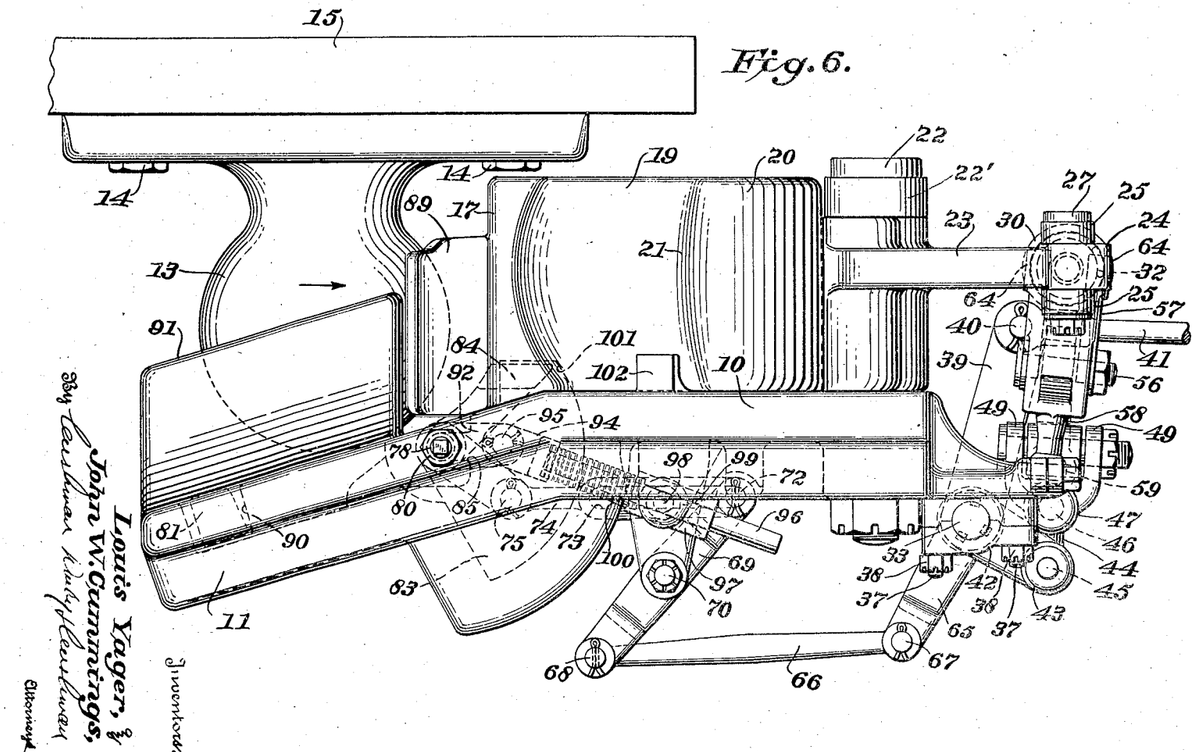
Figure 6 is a side view similar to Figure 1 showing the coupler ball being advanced towards the socket.
Figure 7:
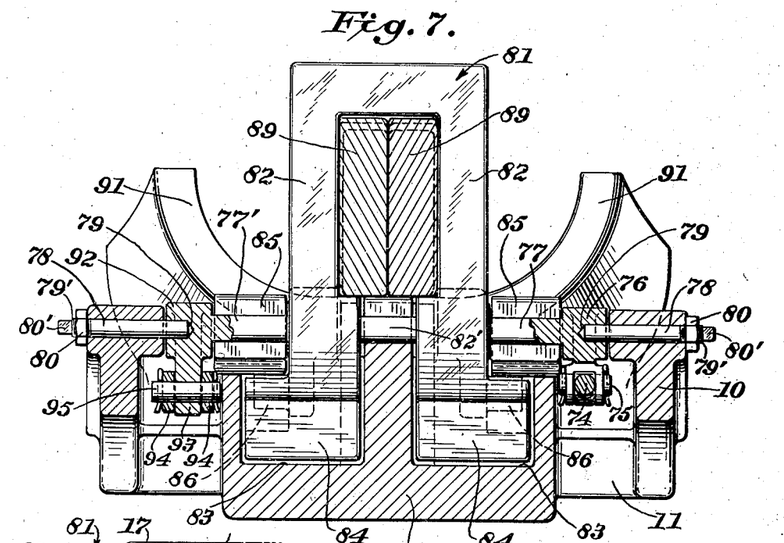
Figure 7 is a sectional view taken substantially along the line 7—7 of Figure 2.
Figure 8:
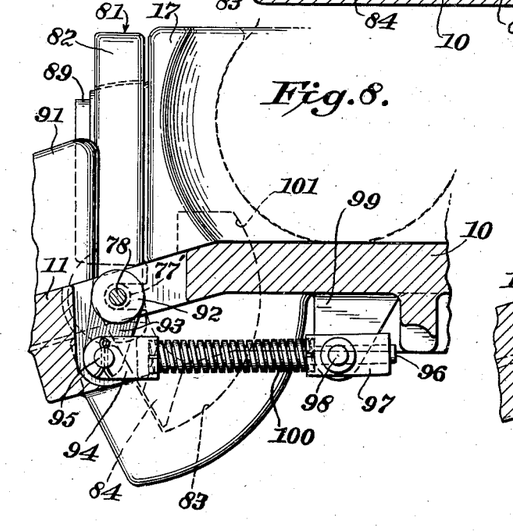
Figure 8 is a sectional view taken substantially along the line 8—8 of Figure 2.

In operation, assuming it is desired to connect a trailer to a tractor, and the parts are in the position as shown in Figure 5 and the movable sections 17 and 18 of the socket member are opened and retained in this position by engagement of the tail pieces 84 which now extend into the recesses 101 of the movable sections. The locking member 81 is now positioned in the recess 90 of the ramp 11 and is yieldably maintained in this position by the expansion of the spring 100 which now swings to assume the inclined position shown in Figure 6 and thus acts against the arm 92 to maintain the locking member in a position substantially flush with the upper surface of the ramp. The springs 32 and 100 are now under maximum compression and the dog levers 57 assume the position shown in full lines in Figure 13. This will not allow free automatic movement of the socket members 17 and 18 about their pivots 27 for the reason that will now be explained. The operating lever 39 and rod 41 which previously had to be moved outwardly to cause the jaws 17 and 18 to be moved to their open position are now actuated by the operator of the tractor so as to be returned to their original or closed position (Figure 3), in order to allow the ball 13 to release the socket members 17 and 18 automatically. This operation is effected by reason of the elongated slots 26, 55 and 73 in the members 25, 50 and 74, respectively, which permit the shaft 73 and its associated parts, including the drag links 50, to assume the position shown in dotted lines in Figure 13 without disturbing the dog levers 57 or the locking engagement of the socket members 17 and 18 with the tail pieces 84. In other words, the movable socket members 17 and 18 which are now under the full power of compression spring 32, are held in this position and cannot be released until the operating lever 39 and rod 41 are moved from the full line position shown in Figure 11 to the dotted line position. Consequently, it is necessary for the operating lever 39 to be returned to its closed position in order that the ball 13 may release the movable socket members 17 and 18 automatically and just immediately before the ball enters the socket 12. As the tractor backs under the trailer, the ball 13 (Fig. 6) engages the ramp 11 and is guided by the fenders 91 upwardly towards the socket 12. The tail pieces 84 are now positioned in the path of the ball 13 and as the latter moves towards its running position, it contacts the tail pieces 84 forcing them downwardly, thus releasing the movable socket members 17 and 18 therefrom. The socket members 17 and 18 are now forced by the heavy compression from spring 32 to move inwardly and close against the ball 13 and snap shut when the ball is completely within the socket. As the ball 13 pushes down the tail pieces 84 into their depressions 83, the lock 81 begins to rise upwardly from the recess 90 behind the movable sections 17 and 18, and when the ball is completely within the socket, the arms 89 of the movable sections engage each other and the locking member 81 is swung about its pivot 77 to the position shown in Fig. 7 so as to coact with the spring 32 to retain the movable socket members in their closed position against the ball 13. As the arm 92 is swung rearwardly during the closing movement of the locking member 81 (Fig. 1), the spring 100 tends to exert a force on the locking member to maintain it in its vertical closed position. As the lock 81 rotates in its slotted bearings 85 to engage the arms 89, it is held firmly in position not only by the slotted bearings but also by the movement of the strain blocks 86 which follow the snug curved portion 88 (Fig. 9) in the depressions 83 so as to produce a wedging action that tends to insure the locking member 81 being firmly but releasably maintained in engagement with the sides of the arms 89 of the movable sections of the socket but slightly spaced from the top thereof (Fig. 7). Thus it will be seen that the movable sections 17 and 18 coact with the fixed section 16 to provide a closed socket for positively retaining the ball 13 therein, while the action of the compression spring 32 and spring 100 tend to further insure the locking member 81 being held firmly in its closed position. Conversely, when it is desired to release the ball 13 from the socket 12 to separate the tractor from the trailer, the operator in the cab or at any other part of the towing vehicle, actuates the rod 41 by movement of a hand lever, foot pedal or the like conveniently positioned near the seat of the operator. The operating shaft 41 and its associated parts are now moved from the position shown in Figure 1 to that shown in dotted lines in Figure 11, and as the rod 41 is pulled forwardly toward the front of the vehicle, it rotates the shaft 33 which, in turn, causes the arm 42 to swing downwardly and also swings the arm 65 to move the rod 66 and its associated parts to the position shown in Figure 6. When this occurs, the arm 42 which is connected through the arm 44 and member 48 with the drag links 50, swings these links downwardly and slightly forwardly to the position shown in Figure 13, thus rocking the arms 58 of the dog levers inwardly towards each other so as to compress the spring 32 in order to release the pressure thereof on the movable sections 17 and 18 of the socket, and permit these sections to swing freely about their pivots 27. At the same time, the downward swinging movement of the arm 65 acts to push the rod 66 rearwardly and the upper end of arm 69 and the rod 73 forwardly. This movement of the rod 73 actuates the arm 76 which, in turn, rotates the studs 77 and 77' and the lock 81 so as to move the latter away from engagement with the arms 89 of the movable sections 17 and 18 and downwardly towards the recess 90 in the ramp 11. The tractor is now moved or driven forwardly so that the pressure of the ball 13 against the unlocked movable sections 17 and 18 swings the latter and the arms 89 outwardly to allow the ball to slide freely from the socket and down the ramp. As the ball 13 moves over the base plate 10 it passes the top end of the lock 81 so as to push the same into the recess 90 where the lock is held by the compression of spring 100 (Fig. 6). When the lock 81 moves into the recess 90, the integral tail pieces 84 on the arms 82 move upwardly from the depressions 83 into the notches 101 (Fig. 6) in the under sides of the movable sections 17 and 18 so as releasably to hold these sections in their opened position. The operating lever 41 is now returned to its original or closed position as shown in full lines in Figure 11 so that when the ball 13 is again moved up on the ramp for the purpose of connecting the trailer to the tractor, the parts will be arranged so that immediately before the ball 13 enters the socket 12, it will release engagement of the tail piece 84 with the movable socket members 17 and 18 in order to close the socket when the ball completely enters the same. Spaced stop lugs 102 extend upwardly from the base 10 to limit the outward swinging movement of the sections 17 and 18. It will be noted that the spring 100 is so connected to the locking shaft 79 and the locking member 81 as to have the dual function of acting to retain the locking member in the recess 90 when it is moved to its inoperative position and also coacts with the compression spring 32 to retain the locking member in engagement with the movable sections 17 and 18 of the socket when the latter are in their closed position. Thus, simple, efficient and positive means are provided for automatically connecting the tractor to the trailer at a minimum expenditure of time and effort and for releasing the tractor from the trailer.

It will be seen that the locking assembly is admirably suited for connecting towing vehicles such as a tractor or a tank to a three-point suspension trailer, and is particularly suitable for use with mobile artillery in which a tank is provided with coupling means for drawing guns and field pieces. Moreover, the coupling connection permits the turning of the tractor through a horizontal angle of 360° without disengaging the trailer therefrom, which feature is highly desirable in transporting mobile artillery. The coupling or trailer hitch assembly is so designed as to allow the tractor and the trailer to move independently, and the locking member when the coupling ball is secured in the socket permits the tractor to be suspended from the trailer, due to the fact that the upper sides of the arms 89 (Fig. 7) may be moved to engage the top of the locking member 81. Because of the automatic opening and closing of the coupling assembly, it is unnecessary for the operator to leave his seat in the cab or other place in order to insure the trailer being quickly and positively connected to the tractor or released therefrom.

It is to be understood that the form of invention shown and described is merely illustrative of a preferred embodiment and that such changes may be made as fall within the purview of one skilled in the art without departing from the spirit of the invention and the scope of the appended claims.

We claim:

1. In combination with a tractor, coupling means for releasably connecting a trailer thereto, said coupling means including a base having a socket arranged to receive a coupler ball, said socket comprising a fixed section and a pair of movable sections adapted to be moved to opened and closed postions relative to the fixed section, pressure means normally urging the movable sections toward each other to retain the ball in the socket, a locking member pivoted on the base and arranged to be moved to maintain the movable sections in their closed position, and means operatively connected to the pressure means and the locking member for releasing the pressure on the movable sections and for moving the locking member away from the movable sections to allow withdrawal of the coupling ball from the socket.

2. In combination with a tractor, coupling means for releasably connecting a trailer thereto, said coupling means including a base having a socket arranged to receive a coupler ball, said socket comprising a fixed section and a pair of movable sections adapted to be moved to opened and closed positions relative to the fixed section, pressure means normally urging the movable sections toward each other to retain the ball in the socket, a locking member pivoted on the base and arranged to be moved to maintain the movable sections in their closed position, means operatively connected to the pressure means and the locking member for releasing the pressure on the movable sections and for moving the locking member away from the movable sections to allow withdrawal of the coupling ball from the socket, and yieldable means maintaining the locking member in its locked position.

3. In combination with a tractor, coupling means for releasably connecting a trailer thereto, said coupling means including a base having a socket arranged to receive a coupler ball, said socket comprising a fixed section and a pair of movable sections adapted to be moved to opened and closed positions relative to the fixed section, pressure means normally urging the movable sections toward each other to retain the ball in the socket, a locking member pivoted on the base and arranged to be moved to maintain the movable sections in their closed position, means operatively connected to the pressure means and the locking member for releasing the pressure on the movable sections and for moving the locking member away from the movable sections to allow withdrawal of the coupling ball from the socket, and means operatively associated with the locking member for maintaining the movable sections in their open position.

4. In combination with a tractor, coupling means for releasably connecting a trailer thereto, said coupling means including a base having a socket arranged to receive a coupler ball, said socket comprising a fixed section and a pair of movable sections adapted to be moved to opened and closed positions relative to the fixed section, pressure means normally urging the movable sections toward each other to retain the ball in the socket, a locking member pivoted on the base and arranged to be moved from an inoperative position to engage the movable sections when the latter are in their closed postion, means operatively connected to the pressure means and the locking member for releasing the pressure on the movable sections and for moving the locking member away from the movable sections to its inoperative position to allow withdrawal of the coupling ball from the socket, and yieldable means operatively associated with the locking member for maintaining the same in its inoperative position, and also for maintaining the locking member in its locked position.

5. In combination with a tractor or the like, means for releasably connecting a trailer thereto, said means including a base on the tractor having a socket arranged to receive a depending member on the trailer, said socket comprising a fixed section and a pair of movable sections arranged to be moved into opened and closed positions relative to the fixed section, compression means engaging said pivoted sections for normally maintaining them in their closed position, a locking member pivotally mounted on the base and arranged to be raised over the movable sections when the latter are closed, and means for releasing the pressure of said compression means and for moving the locking member away from the movable sections to allow withdrawal of the depending member on the trailer from the socket.

6. In combination with a tractor or the like, means for releasably connecting a trailer thereto, said means including a base on the tractor having a socket arranged to receive a depending member on the trailer, said socket comprising a fixed section and a pair of movable sections arranged to be moved into opened and closed positions relative to the fixed section, compression means engaging said pivoted sections for normally maintaining them in their closed position, a locking member pivotally mounted on the base and arranged to be raised over the movable sections when the latter are closed, means for retaining the locking member in its raised position, and means for releasing the pressure of said compression means and for moving the locking member away from the movable sections to allow withdrawal of the depending member on the trailer from the socket.

7. In combination with a tractor or the like, means for releasably connecting a trailer thereto, said means including a base on the tractor having a socket arranged to receive a depending member on the trailer, said socket comprising a fixed section and a pair of movable sections arranged to be moved into opened and closed positions relative to the fixed section, compression means engaging said movable sections for normally maintaining them in their closed position, a locking member pivotally mounted on the base and arranged to be raised over the movable sections when the latter are closed, means for releasing the pressure of said compression means and for moving the locking member away from the movable sections to allow withdrawal of the depending member on the trailer from the socket, and yieldable means for maintaining the locking member against the base and also in its raised position.

8. In combination with a tractor, coupling means for releasably connecting a trailer thereto, sad coupling means including a base on the tractor having a socket arranged to receive a coupler ball on the trailer, said socket comprising a fixed section and a pair of movable sections pivoted at one end to the base and arranged to swing outwardly at the other end to allow the ball to be moved into and out of the socket, said movable sections having spaced forwardly extending arms, a compression spring confined between said arms to urge the opposite ends of the movable sections toward each other, an operating shaft revolubly mounted on the base, and means operatively connecting the shaft to said spaced arms for releasing the pressure of the spring against the movable section to allow withdrawal of the coupler ball from the socket.

9. In combination with a tractor, coupling means for releasably connecting a trailer thereto, said coupling means including a base on the tractor having a socket arranged to receive a coupler ball on the trailer, said socket comprising a fixed section and a pair of movable sections pivoted at one end to the base and arranged to swing outwardly at the other end to allow the ball to be moved into and out of the socket, said movable sections having spaced forwardly extending arms, a compression spring confined between said arms to urge the opposite ends of the movable sections toward each other, an operating shaft revolubly mounted on the base, and means operatively connecting the shaft to said spaced arms for releasing the pressure of the spring against the movable sections to allow withdrawal of the coupler ball from the socket, a locking member pivoted to the base and arranged to be moved into locking engagement with the movable sections when the latter are in their closed position, and means operable by said shaft for releasing the locking member from the movable sections.

10. In combination with a tractor, coupling means for releasably connecting a trailer thereto, said coupling means including a base on the tractor having a socket arranged to receive a coupler ball on the trailer, said socket comprising a fixed section and a pair of movable sections adapted to be moved to open and closed positions relative to the fixed section, pressure means normally urging the movable sections toward each other to retain the ball in the socket, said base having a ramp for guiding the ball into the socket, a locking member pivoted to the base, said locking member arranged to assume an inoperative position substantially parallel with the ramp and to be moved to engage the movable sections when the latter are in their closed position, and means operatively connected to the pressure means and the locking member for releasing the pressure on the movable sections and for moving the locking member away from the movable sections to allow withdrawal of the ball from the socket.

11. In combination with a tractor, coupling means for releasably connecting a trailer thereto, said coupling means including a base on the tractor having a socket arranged to receive a coupler ball on the trailer, said socket comprising a fixed section and a pair of movable sections adapted to be moved to opened and closed positions relative to the fixed sections, pressure means normally urging the movable sections toward each other to retain the ball in the socket, said base having a ramp for guiding the ball into the socket, a locking member pivoted to the base, said locking member arranged to assume an inoperative position substantially parallel with the ramp and to be moved to engage the movable sections when the latter are in their closed position, means operatively connected to the pressure means and the locking member for releasing the pressure on the movable sections and for moving the locking member away from the movable sections to allow withdrawal of the ball from the socket, and means for maintaining the movable sections in their open positions.

12. In combination with a tractor, coupling means for releasably connecting a trailer thereto, said coupling means including a base on the tractor having a socket arranged to receive a coupler ball on the trailer, said socket comprising a fixed section and a pair of movable sections adapted to be moved to opened and closed positions relative to the fixed sections, pressure means normally urging the movable sections toward each other to retain the ball in the socket, said base having a ramp for guiding the ball into the socket, a locking member pivoted to the base, said locking member arranged to assume an inoperative position substantially parallel with the ramp and to be moved to engage the movable sections when the latter are in their closed position, means operatively connected to the pressure means and the locking member for releasing the pressure on the movable sections and for moving the locking member away from the movable sections to allow withdrawal of the ball from the socket, and means operatively connected to the locking member for maintaining the movable sections in their open position.

13. In combination with a tractor, coupling means for releasably connecting a trailer thereto, said coupling means including a base on the tractor having a socket arranged to receive a coupler ball on the trailer, said socket comprising a fixed section and a pair of movable sections adapted to be moved to opened and closed positions relative to the fixed section, pressure means normally urging the movable sections toward each other to retain the ball in the socket, said base having a ramp for guiding the ball into the socket, a locking member pivoted to the base, said locking member arranged to assume an inoperative position substantially parallel with the ramp and to be moved to engage the movable sections when the latter are in their closed position, means operatively connected to the pressure means and the locking member for releasing the pressure on the movable sections and for moving the locking member away from the movable sections to allow withdrawal of the ball from the socket, and said locking member having means arranged to engage the under side of the movable sections to maintain them in their open position.

14. In combination with a tractor, coupling means for releasably connecting a trailer thereto, said coupling means including a base on the tractor having a socket arranged to receive a coupler ball on the trailer, said socket comprising a fixed section and a pair of movable sections adapted to be moved to opened and closed positions relative to the fixed section, pressure means normally urging the movable sections toward each other to retain the ball in the socket, said base having a ramp for guiding the ball into the socket, a locking member pivoted to the base, said locking member arranged to assume an inoperative position substantially parallel with the ramp and to be moved to engage the movable sections when the latter are in their closed position, means operatively connected to the pressure means and the locking member for releasing the pressure on the movable sections and for moving the locking member away from the movable sections to allow withdrawal of the ball from the socket, and yieldable means for maintaining the locking member in its inoperative position and also in engagement with the movable sections when the latter are closed.

15. In combination with a tractor, coupling means for releasably connecting a trailer thereto, said coupling means including a base on the tractor having a socket arranged to receive a coupler ball on the trailer, said socket comprising a fixed section and a pair of movable sections adapted to be moved to opened and closed positions relative to the fixed section, pressure means normally urging the movable sections toward each other to retain the ball in the socket, said base having a ramp for guiding the ball into the socket, said ramp having a recess, an inverted substantially U-shaped locking member pivoted to the base, said locking member arranged to fit in said recess and be moved to engage the movable sections when the latter are in their closed position, yieldable means for retaining the locking member in the recess and also in its locked position, and means operatively connected to the pressure means and the locking member for releasing the pressure on the movable sections and for moving the locking member away from the movable sections to allow withdrawal of the ball from the socket.

16. In combination with a tractor, coupling means for releasably connecting a trailer thereto, said coupling means including a base on the tractor having a socket arranged to receive a coupler ball on the trailer, said socket comprising a fixed section and a pair of movable sections adapted to be moved to opened and closed positions relative to the fixed section, pressure means normally urging the movable sections toward each other to retain the ball in the socket, said base having a ramp for guiding the ball into the socket, said ramp having a recess in its upper surface, an inverted substantially U-shaped locking member pivoted to the base, said locking member arranged to fit in said recess and be moved to engage the movable sections when the latter are in their closed position, yieldable means for retaining the locking member in the recess and also in its locked position, means operatively connected to the pressure means and the locking member for releasing the pressure on the movable sections and for moving the locking member away from the movable sections to allow withdrawal of the ball from the socket, and means operable by the locking member for maintaining the movable sections in their open positions.

17. In combination with a tractor, coupling means for releasably connecting a trailer thereto, said coupling means including a base on the tractor having a socket arranged to receive a coupler ball on the trailer, said socket comprising a fixed section and a pair of movable sections adapted to be moved to opened and closed positions relative to the fixed sections, pressure means normally urging the movable sections toward each other to retain the ball in the socket, said base having a ramp for guiding the ball into the socket, said ramp having a recess, an inverted substantially U-shaped locking member pivoted to the base, said locking member having upwardly extending spaced tail pieces, said base being provided with depressions for receiving said tail pieces, said locking member arranged to be swung upwardly to engage the movable sections when the latter are closed, said tail pieces when the locking member is in said recess projecting upwardly into the path of the ball coupler, and means operatively connected to the pressure means and the locking member for releasing the pressure on the movable sections and for moving the locking member away from the movable sections to allow withdrawal of the ball from the socket, said tail pieces when the movable sections are in their open position being moved upwardly to engage the movable sections, said coupler ball when moved upwardly on the ramp engaging the tail pieces to depress the same and release the movable sections and raise the locking member to engage the movable sections when the ball is moved into the socket.

18. In combination with a tractor, coupling means for relasably connecting a trailer thereto, said coupling means including a base on the tractor having a socket arranged to receive a coupler ball on the trailer, said socket comprising a fixed section and a pair of movable sections adapted to be moved to opened and closed positions relative to the fixed section, pressure means normally urging the movable sections toward each other to retain the ball in the socket, said base having a ramp for guiding the ball into the socket, said ramp having a recess, an inverted substantially U-shaped locking member pivoted to the base and arranged when the movable sections are in their open position to extend into said recess, said base adjacent the upper end of the ramp having spaced depressions, said locking member having spaced tail pieces arranged to be moved into said depressions, said tail pieces extending upwardly from the base when the locking member is in said recess and having portions engaging the movable sections to remain the latter in their open position and portions disposed in the path of the coupler ball, said tail pieces being released from the movable sections and moved into said depressions by the coupler ball as the latter moves toward the socket, said locking member upon depression of the tail pieces being swung upwardly to engage the movable sections when the ball moves into the socket, and means operatively connected to the pressure means and the locking member for releasing the pressure on the movable sections and for moving the locking member away from the movable sections to allow withdrawal of the ball from the socket and effect engagement of the tail pieces with the movable sections to maintain the latter in their open position.

19. In combination with a tractor, coupling means for releasably connecting a trailer thereto, said coupling means including a base on the tractor having a socket arranged to receive a coupler ball on the trailer, said socket comprising a fixed section and a pair of movable sections adapted to be moved to opened and closed positions relative to the fixed section, pressure means normally urging the movable sections toward each other to retain the ball in the socket, said base having a ramp for guiding the ball into the socket, said ramp having a recess, an inverted substantially U-shaped locking member pivoted to the base and arranged when the movable sections are in their open position to extend into said recess, said base adjacent the upper end of the ramp having spaced depressions, said locking member having spaced tail pieces arranged to be moved into said depressions, said tail pieces extending upwardly from the base when the locking member is in said recess and having portions engaging the movable sections to retain the latter in their open position and portions disposed in the path of the coupler ball, said tail pieces being released from the movable sections and moved into said depressions by the coupler ball as the latter moves toward the socket, said locking member upon depression of the tail pieces being swung upwardly to engage the movable sections when the ball moves into the socket, means operatively connected to the pressure means and the locking member for releasing the pressure on the movable sections and for moving the locking member away from the movable sections to allow withdrawal of the ball from the socket and effect engagement of the tail pieces with the movable sections to maintain the latter in their open position, and yieldable means operable by said last mentioned means for maintaining the locking member in said recess and also in engagement with the movable sections when the latter are in their closed position.

20. In a coupling assembly, a base having a socket, said socket including a fixed section and a pair of coacting movable sections pivoted to the base and arranged to be moved toward the fixed section to close the socket and away therefrom to open the socket, compression means normally urging the movable sections to close the socket, a rock shaft extending transversely of the base and positioned below the compression means, and means operatively connecting the rock shaft to the compression means so that upon rotation of the rock shaft in one direction to contract the compression means so as to allow the movable sections to be moved away from the fixed section.

21. In a coupling assembly, a base having a socket, said socket including a fixed section and a pair of coacting movable sections pivoted on the base and arranged to be moved toward the fixed section to close the socket and away therefrom to open the socket, spring means normally urging the movable sections to close the socket, a shaft revolubly connected to the base, spaced dog levers movable on the base and having arms engaging the ends of the spring means, and a universal coupling connecting the shaft to the dog levers so that upon rotation of the shaft the dog levers are actuated to compress the spring means.

22. In a coupling assembly, a base having a socket, said socket including a fixed section and a pair of coacting movable sections pivoted on the base and arranged to be moved toward the fixed section to close the socket and away therefrom to open the socket, spring means normally urging the movable sections to close the socket, a shaft revolubly connected to the base, spaced dog levers movable on the base and having arms engaging the ends of the spring means, drag links connected to the dog levers, and means operatively connecting the shaft to the drag links so that upon rotation of the shaft to move the arms of the dog levers toward each other to compress the spring means.

23. In a coupling assembly, a base having a socket, said socket including a fixed section and a pair of coacting movable sections pivoted on the base and arranged to be moved toward the fixed section to close the socket and away therefrom to open the socket, spring means normally urging the movable sections to close the socket, an operating shaft revolubly connected to the base, spaced dog levers movable on the base and having arms engaging the ends of the spring means, and drag links connected at their outer ends to the dog levers, and a rod pivotally connected to the inner ends of said drag links and to said shaft, the parts being constructed and arranged so that upon rotation of said shaft the rod swings the drag links downwardly and the arms of the dog levers inwardly to compress the spring means and release the tension on the movable sections of the socket.

LOUIS YAGER.
JOHN W. CUMMINGS.